US012767339B2

(12) United States Patent
Pautis

(10) Patent No.: US 12,767,339 B2
(45) Date of Patent: Oct. 20, 2026

(54) ASSEMBLY OF AN ENGINE MOUNTING PYLON WITH AN AIRCRAFT ENGINE

(71) Applicant: Airbus Operations SAS, Toulouse (FR)

(72) Inventor: Olivier Pautis, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 21 days.

(21) Appl. No.: 18/967,235

(22) Filed: Dec. 3, 2024

(65) Prior Publication Data

US 2025/0206452 A1 Jun. 26, 2025

(30) Foreign Application Priority Data

Dec. 22, 2023 (FR) ....................................... 2315130

(51) Int. Cl.
*B64D 27/40* (2024.01)

(52) U.S. Cl.
CPC .................................. *B64D 27/402* (2024.01)

(58) Field of Classification Search
CPC .. B64D 27/402; B64D 27/404; B64D 27/406; B64D 27/40
USPC .................................................. 248/554–557
See application file for complete search history.

(56) References Cited

U.S. PATENT DOCUMENTS 5,620,154 A * 4/1997 Hey ....................... B64D 27/18 60/797
8,074,923 B2 * 12/2011 Foster .................. B64D 27/404 244/54
8,205,825 B2 * 6/2012 Huggins .............. B64D 27/402 244/54
8,474,750 B2 * 7/2013 Marche ................ B64D 27/402 244/54
9,862,497 B2 * 1/2018 Ewens ................. B64D 27/402
10,988,264 B2 * 4/2021 Jule ........................... B64C 3/32
11,465,765 B2 * 10/2022 Blanc ...................... B64D 27/18
11,472,573 B2 * 10/2022 Chauveau ............ B64D 27/402
11,542,025 B2 1/2023 Berjot et al.
11,572,186 B2 * 2/2023 Gueneau ................. B64C 3/185
12,337,978 B2 * 6/2025 Pautis ..................... B64D 27/40
12,539,974 B2 * 2/2026 Berjot .................... B64D 27/12
2002/0104924 A1 * 8/2002 Roszak ................ B64D 27/404 244/54
2003/0025033 A1 * 2/2003 Levert .................. B64D 27/404 244/54
2003/0173456 A1 * 9/2003 Levert .................. B64D 27/402 244/54
2009/0266933 A1 * 10/2009 Foster .................. B64D 27/404 244/54

(Continued)

FOREIGN PATENT DOCUMENTS

FR 3113484 A1 2/2022

*Primary Examiner* — Muhammad Ijaz

(74) *Attorney, Agent, or Firm* — Greer, Burns & Crain, Ltd.

(57) ABSTRACT

A front engine mount system for an aircraft comprising an assembly secured, on the one hand, to the engine mounting pylon and, on the other hand, to a set of front fittings of an engine; the assembly being situated at the front of the engine/engine mounting pylon assembly and having, on the one hand, a central articulation system articulated to the clevis block of the engine and two lateral articulation systems connected to the engine.

11 Claims, 6 Drawing Sheets

(56) References Cited

U.S. PATENT DOCUMENTS

| | | | | |
|---|---|---|---|---|
| 2010/0206981 | A1* | 8/2010 | Baillard | B64D 27/404 244/54 |
| 2011/0001002 | A1* | 1/2011 | Chouard | B64D 27/404 244/54 |
| 2012/0056033 | A1* | 3/2012 | Teulou | B64D 27/402 244/54 |
| 2012/0104162 | A1* | 5/2012 | West | B64C 1/1453 244/54 |
| 2015/0013142 | A1* | 1/2015 | West | B64D 27/18 29/525.08 |
| 2015/0197341 | A1* | 7/2015 | Ewens | B64D 27/402 244/54 |
| 2016/0221682 | A1* | 8/2016 | Pautis | B64D 27/18 |
| 2019/0135445 | A1* | 5/2019 | Combes | B64D 27/404 |
| 2020/0324917 | A1* | 10/2020 | Chauveau | B64D 27/402 |
| 2020/0369396 | A1* | 11/2020 | Labarthe | B64D 27/402 |
| 2020/0385131 | A1* | 12/2020 | Deforet | B64D 27/404 |
| 2020/0385132 | A1* | 12/2020 | Deforet | B64D 27/404 |
| 2021/0101689 | A1* | 4/2021 | Blanc | B64D 27/18 |
| 2021/0114741 | A1* | 4/2021 | Berjot | B64D 27/404 |
| 2021/0354839 | A1* | 11/2021 | Pautis | B64D 27/404 |
| 2022/0055758 | A1* | 2/2022 | Berjot | B64D 27/18 |
| 2022/0106048 | A1* | 4/2022 | Gueneau | B64C 3/187 |
| 2022/0119122 | A1* | 4/2022 | West | B64D 27/40 |
| 2022/0194610 | A1* | 6/2022 | Tulloch | B64C 3/185 |
| 2022/0355946 | A1* | 11/2022 | Berjot | B64D 27/18 |
| 2023/0028982 | A1* | 1/2023 | Glemarec | B64D 27/404 |
| 2023/0030853 | A1* | 2/2023 | Messina | B64D 27/18 |
| 2023/0072158 | A1* | 3/2023 | Berjot | B64D 27/40 |
| 2023/0122444 | A1* | 4/2023 | Rumiel | B64D 27/402 244/54 |
| 2024/0150028 | A1* | 5/2024 | Pautis | B64D 27/40 |
| 2024/0327008 | A1* | 10/2024 | Pautis | B64D 27/18 |
| 2024/0336365 | A1* | 10/2024 | Berjot | B64D 27/402 |
| 2025/0002165 | A1* | 1/2025 | Berjot | B64D 27/18 |
| 2025/0002166 | A1* | 1/2025 | Berjot | B64D 27/12 |
| 2025/0010998 | A1* | 1/2025 | Combes | B64D 27/18 |
| 2025/0100701 | A1* | 3/2025 | Powell | B64D 27/402 |
| 2025/0121946 | A1* | 4/2025 | Combes | B64D 27/40 |
| 2025/0197017 | A1* | 6/2025 | Berjot | B64D 27/40 |
| 2025/0206452 | A1* | 6/2025 | Pautis | B64D 27/404 |

* cited by examiner

ASSEMBLY OF AN ENGINE MOUNTING PYLON WITH AN AIRCRAFT ENGINE

CROSS-REFERENCES TO RELATED APPLICATIONS

This application claims the benefit of French Patent Application Number 2315130 filed on Dec. 22, 2023, the entire disclosure of which is incorporated herein by way of reference.

FIELD OF THE INVENTION

The present invention relates to an assembly of an engine mounting pylon with an aircraft engine.

BACKGROUND OF THE INVENTION

Conventionally, an aircraft comprises at least one propulsion unit fixed beneath each of its wings. Each propulsion unit comprises an engine mounted beneath the wing by means of an engine mounting pylon. The engine mounting pylon has a rigid structure fixed to the wing and referred to as the "primary structure". The engine mounting pylon is assembled with the engine by means of a system of engine mounts comprising, in particular, a front engine mount situated at the front of the engine mounting pylon, and a rear engine mount situated at the rear of the engine mounting pylon.

Patent application FR3113484 describes an assembly of an engine mounting pylon with an aircraft engine according to the prior art. In that patent application, and with reference to FIG. 1, the engine mounting pylon comprises a primary structure 104 in the form of a box structure, fixed to the engine, at the front, by a front engine mount 180. The engine extends from front to rear along a longitudinal axis X1.

The plane passing through the longitudinal axis X1, orthogonal to the ground, namely to the horizontal, and which divides the pylon-engine assembly into two, port and starboard, parts is referred to as the median vertical plane V1.

The primary structure 104 comprises upper spars and lower spars 104*a*, 104*b* respectively forming the upper and lower faces of the box structure, and port and starboard lateral panels 104*c*, 104*d* forming the respectively port and starboard lateral walls of the box structure. The walls and the spars delimit an opening 105 at the front of the primary structure 104. The front engine mount 180 comprises a front transverse reinforcement 110 comprising a plate 111 that is positioned approximately in a plane transverse to the median vertical plane V1 and that has a rear face F111 oriented toward the primary structure 104. The front transverse reinforcement 110 has a projecting shape 112 that projects with respect to the rear face F111 and that is fitted into the opening 105. The plate 111 extends respectively, to the port side of the median vertical plane V1 so that it projects with respect to the port-side lateral panel 104*c* and, to the starboard side of the median vertical plane V1 so that it projects with respect to the starboard-side lateral panel 104*d*.

The front engine mount 180 further comprises:

- a first link rod 118 connected to the engine 102 by a first engine-connecting pin 126*b* and a second link rod 119 connected to the engine by a second engine-connecting pin 126*a*, and each of the first and second link rods 118, 119 is Y-shaped and comprises a single branch at a first end collaborating with a clevis block 117 belonging to the engine 102, and two mutually-parallel branches at a second end, between which branches the plate 111 is positioned; and
- a first reinforcement-connecting pin 124*b* connecting the first link rod 118 and the front transverse reinforcement 110 and passing through the plate 111 to the port side of the median vertical plane V1 and a second reinforcement-connecting pin 124*a* connecting the second link rod 119 and the front transverse reinforcement 110 and passing through the plate 111 to the starboard side of the median vertical plane V1.

The assembly of an engine mounting pylon with an engine as described in patent application FR3113484 is entirely satisfactory in terms of the mechanical integrity required for reacting the loads originating from the engine. However, the integration of large-sized engines requires that the design of the assembly described hereinabove be modified in order to bring the engine closer to the engine mounting pylon in order to maintain an acceptable ground clearance.

SUMMARY OF THE INVENTION

The invention fully or partly meets this need. To this end, the invention relates to an assembly of an engine mounting pylon with an aircraft engine, according to one or more embodiments described herein. The invention also relates to an aircraft comprising such an assembly.

BRIEF DESCRIPTION OF THE DRAWINGS

The aforementioned features of the invention, along with others, will become more clearly apparent on reading the following description of one exemplary embodiment, said description being given with reference to the appended drawings, in which.

DETAILED DESCRIPTION OF THE PREFERRED EMBODIMENTS

Figure 1:
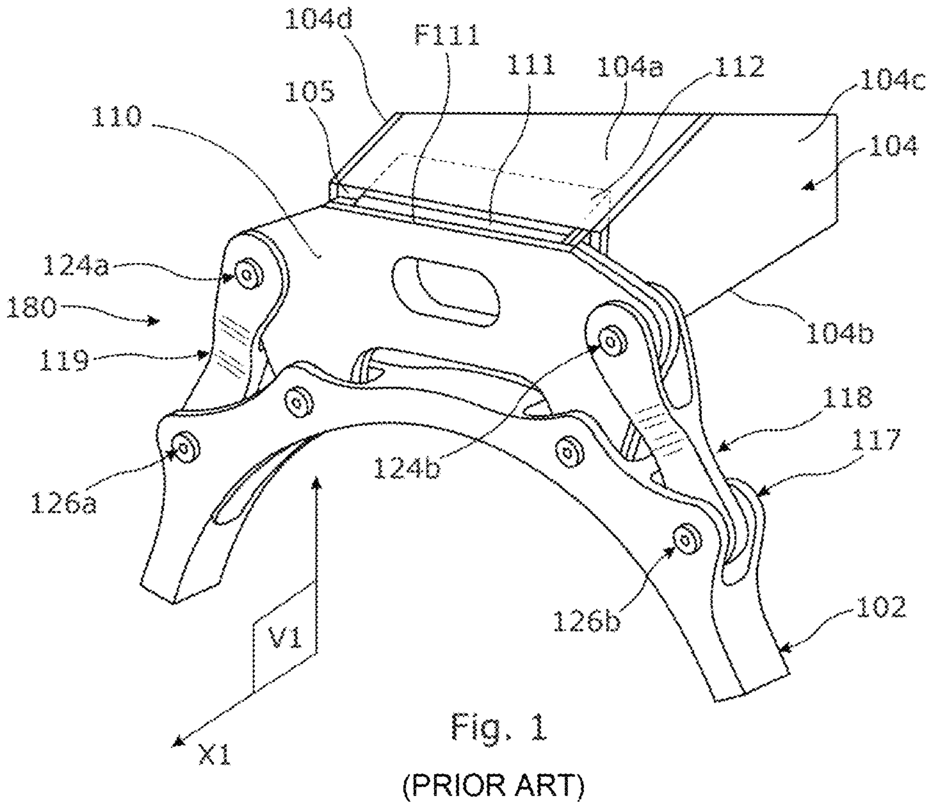
Fig. 1 (PRIOR ART)
FIG. 1, which has already been described, is a perspective view, from the front, of an assembly of an engine mounting pylon with an engine, according to the prior art.
Figure 2:
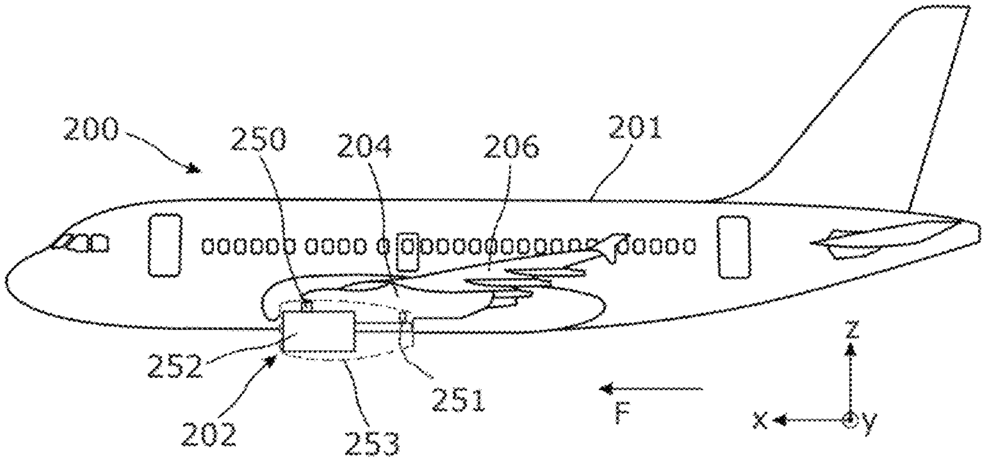
FIG. 2 is a side view of an aircraft comprising an assembly of an engine mounting pylon with an engine, according to one embodiment of the invention.
Figure 3:
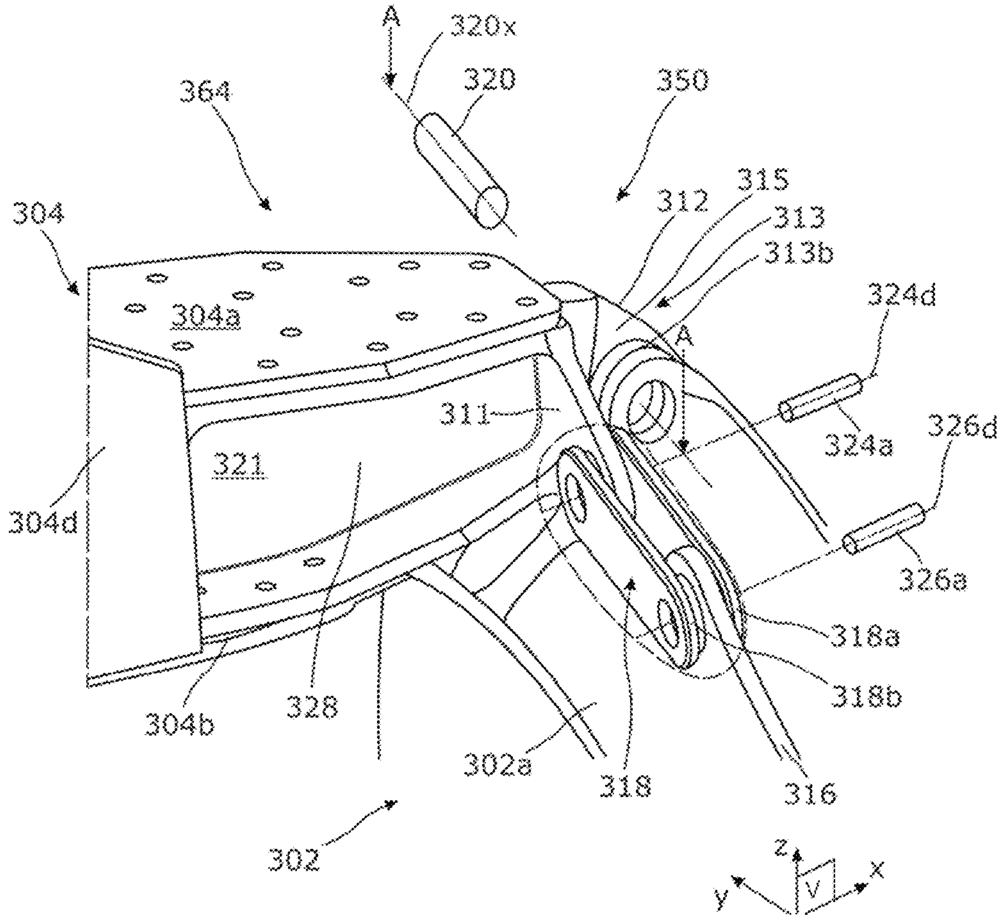
FIG. 3 is a perspective view, from the rear and from a first side, of the assembly depicted in FIG. 2, according to a first embodiment of the invention.
Figure 4:
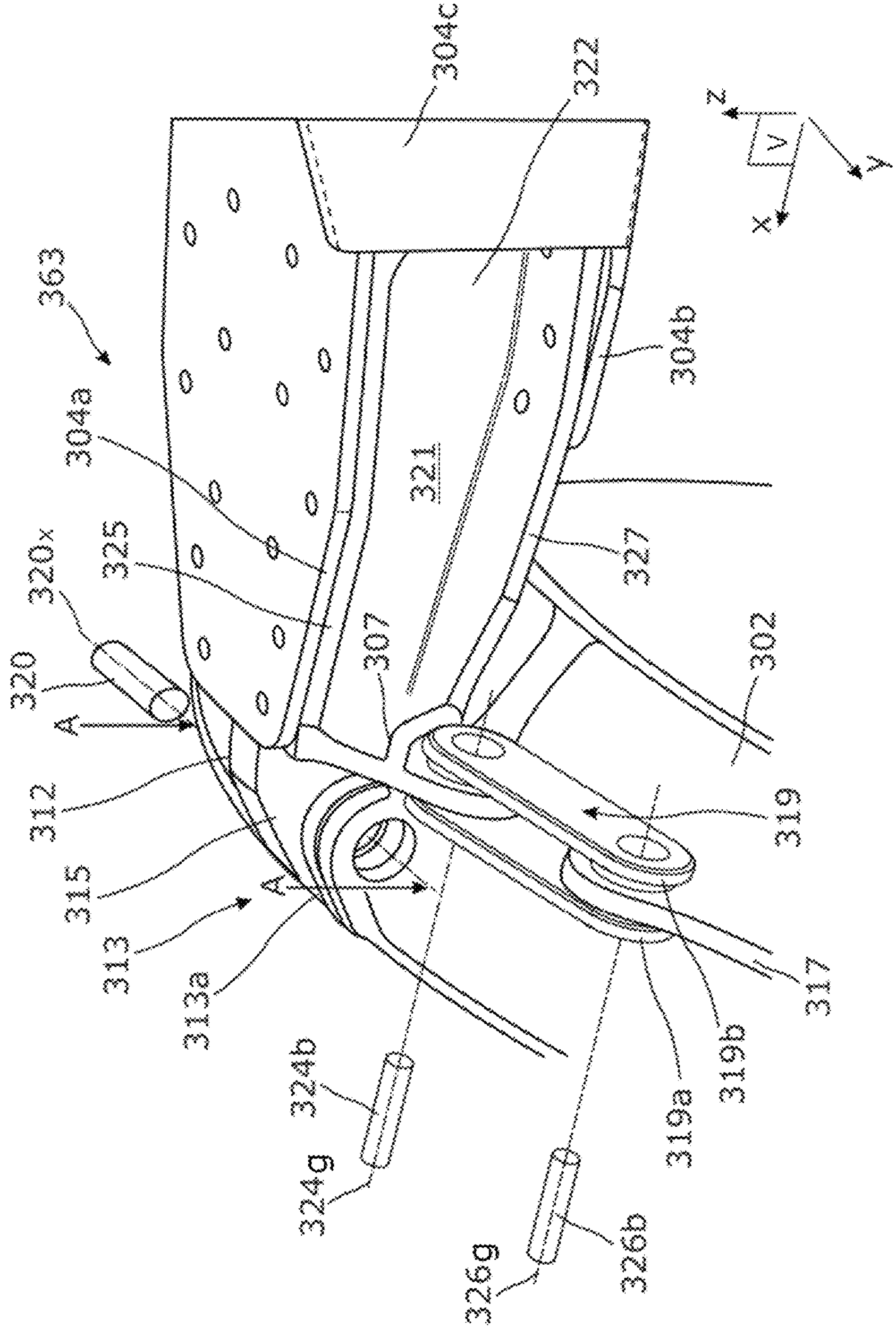
FIG. 4 is a view similar to FIG. 3, from the rear and from a second side, of the assembly depicted in FIG. 2, according to a first embodiment of the invention.
Figure 5:
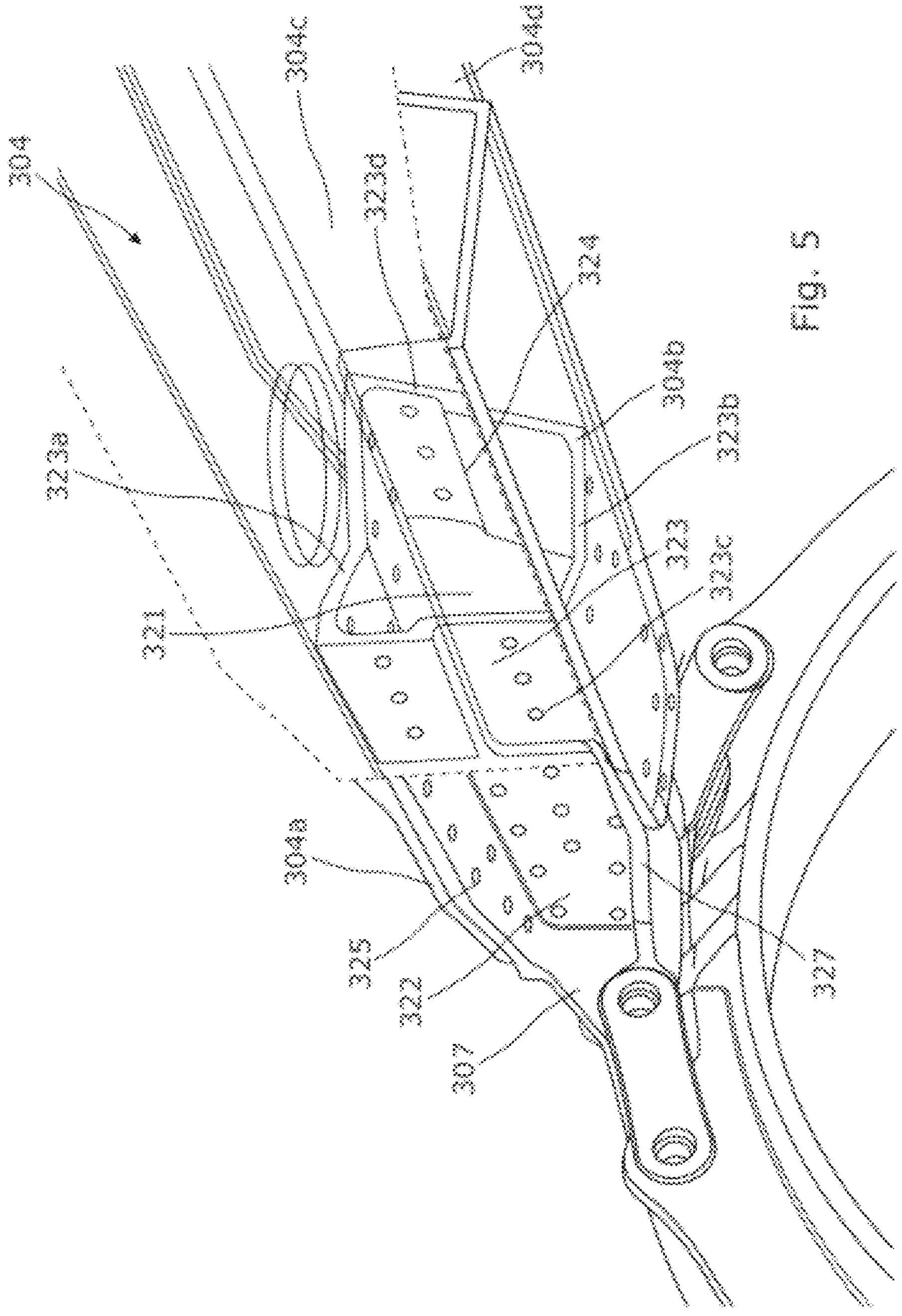
FIG. 5 is a rear perspective view of the assembly depicted in FIGS. 3 and 4, with the engine mounting pylon depicted transparently.

With reference to FIG. 2, an aircraft 200 comprises a fuselage 201 to which there is fixed, on each side, a wing 206 beneath which at least one propulsion unit 202 is mounted. Each propulsion unit 202 comprises an engine mounting pylon 204 fixed beneath the wing 206 and an engine 252 fixed to the engine mounting pylon 204. Connection between the engine mounting pylon and the engine is obtained by means of a front engine mount 250 and of a rear engine mount 251. The engine envelope depicted in dotted line constitutes the engine nacelle 253.

By convention, the longitudinal axis of the engine and therefore of the propulsion unit 202 is referred to as X. Moreover, Y denotes the transverse axis of the engine, this axis being horizontal when the aircraft is on the ground, and Z denotes the vertical axis or vertical height when the aircraft is on the ground, these three directions X, Y and Z being mutually orthogonal.

Moreover, the terms “front” and “rear” are to be considered relative to a direction of forward movement of the aircraft 200 when the engine is in operation, this direction being schematically indicated by the arrow F in the figures. Likewise, the terms “port” and “starboard” define lateral positions with respect to the direction of forward travel, these being respectively the left and right sides of the aircraft.

The engine has a shape exhibiting symmetry of revolution about the longitudinal axis X.

With reference to FIGS. 3 to 6, the engine mounting pylon comprises a primary structure 304 in the form of a hollow box structure extending from front to rear along the longitudinal axis X. The primary structure 304 is separated into two, port and starboard, parts by a longitudinal median vertical plane V passing through the longitudinal axis X, and orthogonal to the ground, namely to the horizontal. The port-side and starboard-side parts of the primary structure 304 are symmetrical with one another about the median vertical plane V.

The primary structure 304 comprises an internal structure (not depicted) covered with panels which include a planar upper panel, or upper spar 304*a*, which forms the upper face of the box structure, and a planar lower panel, or lower spar 304*b*, which forms the lower face of the box structure and which faces the ground. The panels further comprise two lateral panels forming the sides of the box structure, these being a planar lateral panel arranged to the port side of the median vertical plane V and referred to as port-side lateral panel 304*c*, and a planar lateral panel arranged to the starboard side of the median vertical plane V and referred to as starboard-side lateral panel 304*d*.

Each of the upper spar 304*a*, lower spar 304*b*, starboard-side lateral panel 304*d* and port-side lateral panel 304*c* comprises an interior face oriented toward the inside of the box structure and an exterior face oriented toward the outside of the box structure.

The engine is fixed to the engine mounting pylon by means of a system of engine mounts comprising:

- a rear engine mount (not depicted) fixed, on the one hand, to the lower spar and, on the other hand, to a set of rear fittings secured to the engine, the rear engine mount and the set of rear fittings being situated at the rear of the engine/engine mounting pylon assembly, and,
- a front engine mount 363 fixed, on the one hand, to the engine mounting pylon and, on the other hand, to a set of front fittings 350 secured to the engine, the front engine mount 363 and the set of front fittings being situated at the front of the engine/engine mounting pylon assembly.

The rear engine mount and the set of rear fittings may adopt any form known to those skilled in the art and will not be described further.

The set of front fittings 350 comprises:

- a fixing clevis block 313 with two pairs of branches, wherein the pairs of branches 313*a* and 313*b* are distributed one on each side of the vertical median plane V. The port-side pair of branches 313*a* comprises two branches 313-1 and 313-2 situated to the port side of the vertical median V, and the starboard-side pair of branches 313*b* comprises two branches 313-3 and 313-4 situated to the starboard side of the median vertical plane V. Each of the branches extends parallel to the median vertical plane V and comprises a through-bore the axis of which bore is parallel to an axis 320*x* oriented transversely to the vertical median plane V. The axes of the bores of the various branches are aligned and coincident with the axis 320*x* and the bores are substantially identical. Each of said through-bores is fitted with a bushing; and,
- two transverse fixing lugs, distributed one each side of the vertical median plane V, and symmetrically about same, thus defining a port-side transverse fixing lug 317 situated to the port side of the vertical median plane V and a starboard-side transverse fixing lug 316 situated to the starboard side of the median vertical plane. Each transverse fixing lug 316, 317 extends transversely to the median vertical plane V. Each of the transverse fixing lugs 316, 317 has a through-bore the axis of which bore is oriented parallel to the longitudinal axis X, the starboard-side transverse fixing lug 316 having a bore axis 326*d* and the port-side transverse fixing lug 317 having a bore axis 326*g*. The bores of the port-side transverse fixing lug 317 and starboard-side transverse fixing lug 316 are substantially identical with a different radial clearance and with their axes symmetrical about the vertical median plane V. The through-bores of each of the transverse fixing lugs are fitted with a swivel bearing.

The front engine mount 363 takes the form of an elongate body extending from front to rear along the longitudinal axis X and comprising at its front end a planar front face 329 situated in a plane perpendicular to the longitudinal axis X and, at its rear end, a rear face. The body is partially fitted, from its rear face, into the primary structure 304 and extends the latter forward. The body comprises on its front face 329:

- a central articulation system 312 inserted between two branches of the clevis block 313 that are separated from one another by the median vertical plane V, and directly articulated to the clevis block 313 by means of a first pivot pin 320 extending transversely to the vertical median plane V and passing through the clevis block 313 and the central articulation system 312; and,
- two lateral articulation systems, 318, 319 which are symmetrical with one another about the vertical median plane V, these being a port-side lateral articulation system 309 situated to the port side of the vertical median plane V and a starboard-side lateral articulation system 318 situated to the starboard side of this same plane. The port-side lateral articulation system 319 is articulated to the port-side transverse fixing lug 317 by means of a pivot pin 326*b* parallel to the longitudinal axis X, and the starboard-side lateral articulation system 318 is articulated to the starboard-side transverse fixing lug 316 by means of a third pivot pin 326*a* parallel to the longitudinal axis X. The two transverse fixing lugs 316, 317 are situated to the rear of the clevis block 313.

The first pivot pin 320 of the central articulation system 312 articulating to the clevis block 313 extends between a plane along which the upper spar 304*a* extends and a plane along which the lower spar 304*b* extends. Thus, with this arrangement, the engine is situated as close as possible to the engine mounting pylon.

In a first embodiment of the invention illustrated in FIGS. 3, 4, 5 and 6, the body comprises a beam 321 extending along the longitudinal axis X and the central articulation system 312 and the lateral articulation systems 318 and 319 are machined, with the beam 321, as a single entity.

The beam 321 comprises a planar front face 329 forming the front face of the body and situated at the front end of the beam 321, a rear face situated at the rear end of the beam 321 and forming the rear face of the body, and by means of which the beam 321 is fitted into the primary structure 304.

The beam 321 comprises an upper face 325, a lower face 327, a port-side lateral face 322 and a starboard-side lateral face 328. Each face of the beam 321 comprises, in the rear part of the beam 321, a flange 323 for fixing the beam 321 to the primary structure 304 there being, respectively, an upper flange 323*a* for fixing the beam 321 to the lower face of the upper spar 304*a*, a lower flange 323*b* for fixing the beam 321 to the interior face of the lower spar 304*b*, and two lateral flanges, a port-side lateral flange 323*c* and a starboard-side lateral flange 323*d*, for fixing the beam 321 to, respectively, the interior face of the port-side lateral panel 304*c* and the starboard-side lateral panel 304*d*. Each flange is configured in such a way as to conform to the shape of the interior face of the spar or of the panel to which it is fixed. The beam 321 is fixed to the primary structure 304 by bolting or welding or any other known means.

The central articulation system 312 takes the form of a planar fixing lug, referred to as central fixing lug 315, fixed to the front face 329 of the beam 321 and extending forward of the beam 321 and parallel to the vertical median plane V. The central fixing lug 315 has identical dimensions on each side of the vertical median plane V. The central fixing lug 315 is pierced with a through-bore the axis of which bore is parallel to an axis 320*x* oriented transversely to the vertical median plane V. The through-bore of the central fixing lug 315 is fitted with a swivel bearing.

Figure 6:
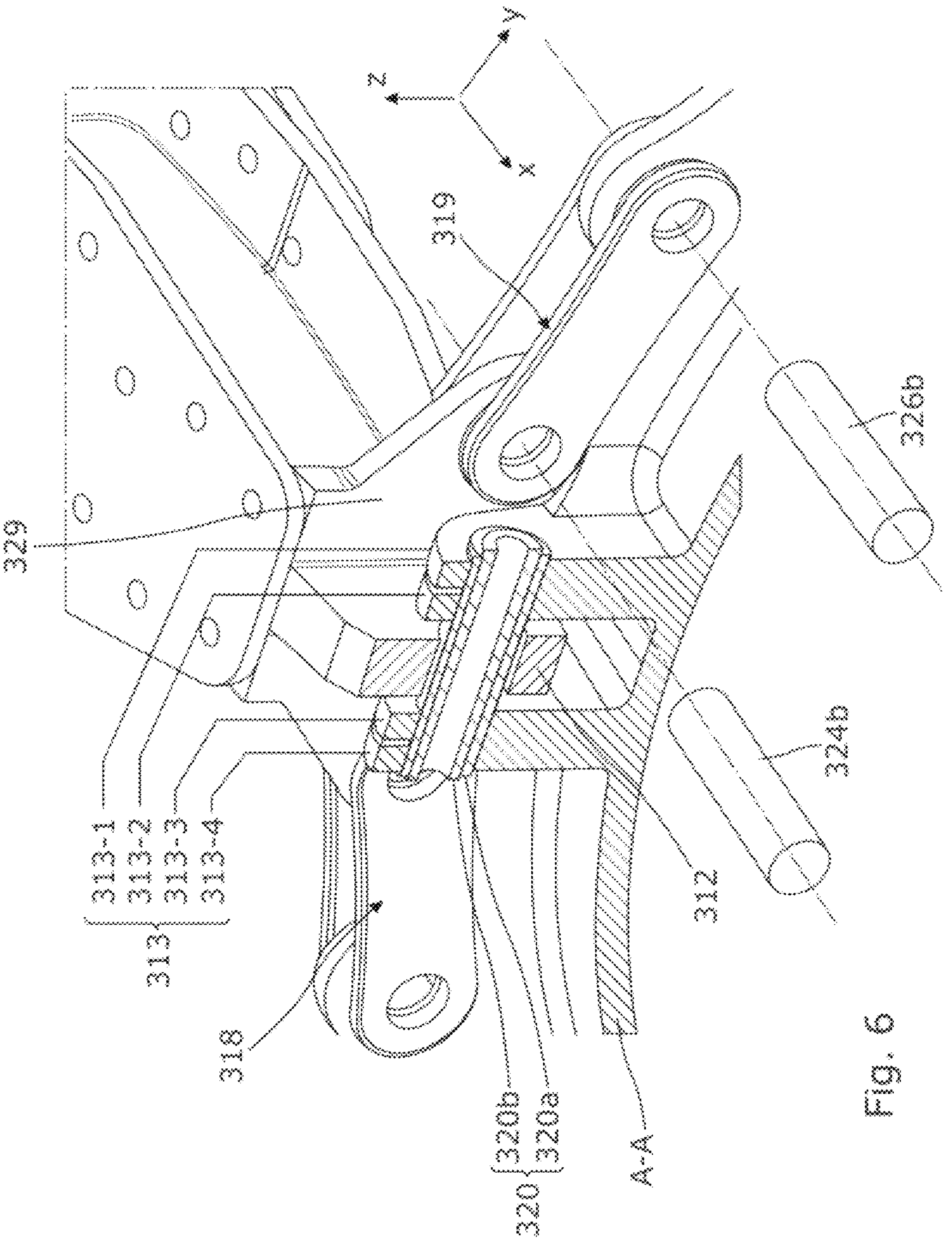
FIG. 6 is a front perspective view, in section on the line A-A, of the assembly depicted in FIG. 3.
Figure 7:
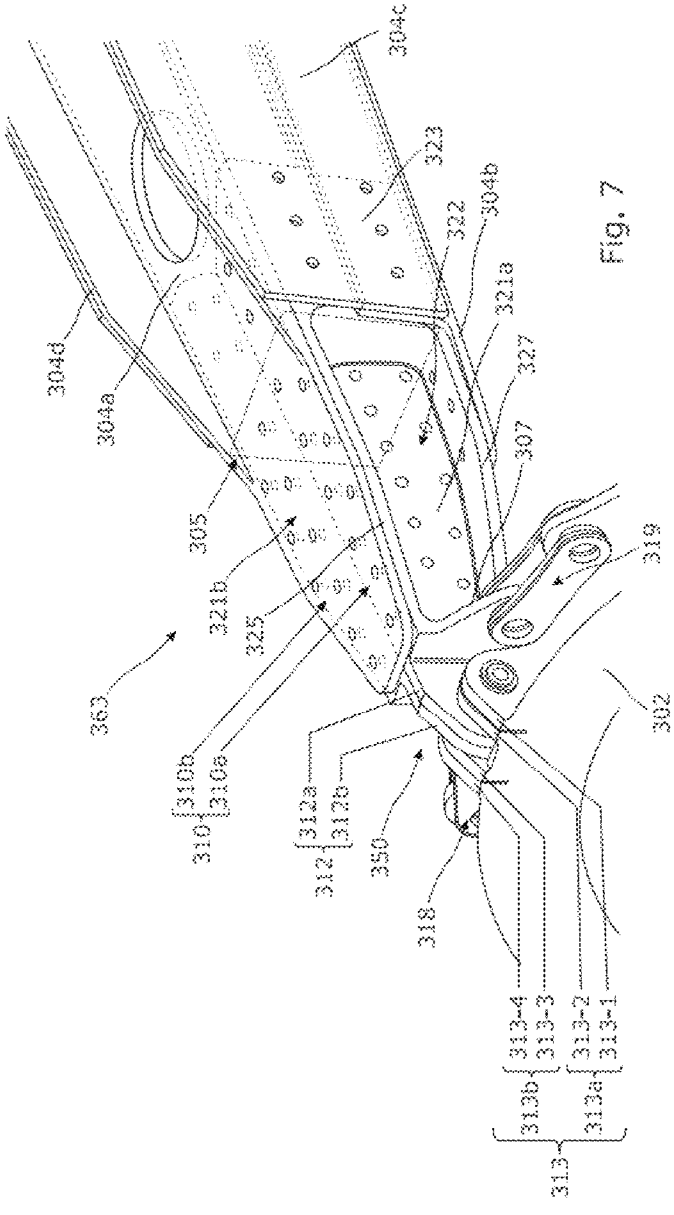
FIG. 7 is a front perspective view of the assembly depicted in FIG. 2 according to a second embodiment of the invention, with the engine mounting pylon depicted transparently.

The central fixing lug 315 is articulated to the clevis block 313 by means of a pivot pin 320 extending transversely to the vertical median plane. Said pivot pin 320 is pushed into the swivel bearing of the central fixing lug 315 and, on each side of this swivel bearing, into the bushings mounted in the bores of a pair of branches of the clevis block 313. As illustrated in FIG. 6, this first pivot pin 320 is preferably lined and comprises two coaxial parts: 320*a*, which is referred to as the main pin, and 320*b*, which is referred to as the secondary pin, which have different diameters. Over a first part, the main pin 320*a* is engaged, forming a primary load-transmission pathway by being a tight fit in the through-bore of the central fixing lug 315, and the secondary pin 320*b* is on standby and comes into operation to absorb the load if the main pin should break.

Tight fits with minimal radial clearance enable load to be transmitted directly from one part to another, whereas the presence of a greater radial clearance does not allow load to be transferred directly. This transfer of load becomes possible only if an element in the primary load transmission pathway fails and two elements that are mounted with clearance with respect to one another move in such a way as to cancel the clearance and come into contact, thus allowing load to be transferred via a second load-transfer pathway.

The port-side lateral articulation system 319 comprises a planar extension, referred to as port-side extension 307, and a pair of straight link rods 319*a*, 319*b*, referred to as the port-side link rods pair, which pair is articulated to the port-side extension 307 and sandwiches the port-side extension 307. The port-side extension 307 projects out to the port side of the front face 329 of the body in the same plane as the front face 329 of the body. The port-side extension 307 thus extends the front face 329 of the port side, beyond the plane along which the port-side lateral panel 304*c* extends.

Similarly, the starboard-side lateral articulation system 318 comprises a planar extension, referred to as starboard-side extension 311, and a pair of straight link rods 318*a*, 318*b*, referred to as the starboard-side link rods pair, which pair is articulated to the starboard-side extension 311 and sandwiches the starboard-side extension 311. The starboard-side extension 311 projects out to the starboard side of the front face 329 of the body in the same plane as the front face 329 of the body. The starboard-side extension 311 thus extends the front face 329 of the starboard side, beyond the plane along which the starboard-side lateral panel 304*d* extends.

Each of the port-side extension 307 and starboard-side extension 311 is pierced with a through-bore, there being a port-side through-bore along the bore axis 324*g* on the port-side extension 307 and a starboard-side through-bore along the bore axis 324*d* on the starboard-side extension 311. Each of said bores has a bore axis oriented parallel to the vertical median plane V. The two, port-side and starboard-side, through-bores are symmetrical with one another about the median plane V and each of the bores is fitted with a swivel bearing.

The link rods 318*a*, 318*b* of the starboard-side link rods pair and the link rods 319*a*, 319*b* of the port-side link rods pair are identical. Each link rod has two ends, and a through-bore passing through each of the ends of the link rod.

Each link rod 319*a*, 319*b* of the port-side link rods pair is mounted articulated at its first end to the port-side extension 307 by means of a pivot pin 324*b* extending parallel to the longitudinal axis X.

The link rods 319*a*, 319*b* of the port-side pair and the port-side extension 307 are articulated to one another by a connection of the clevis block type using a fourth pivot pin 324*b* pushed into the swivel bearing of the port-side extension 307 and, on each side of this swivel bearing, into a bushing (not depicted) mounted in the through-bore arranged at the first end of each link rod 319*a*, 319*b* of the port-side link rods pair.

Each link rod 318*a*, 318*b* of the starboard-side link rods pair is mounted articulated at its first end to the starboard-side extension 311 by means of a fifth pivot pin 324*a* extending parallel to the longitudinal axis X.

The link rods 318*a*, 318*b* of the starboard-side pair and the starboard-side extension 311 are articulated to one another by a connection of the clevis block type using a fifth pivot pin 324*a* pushed into the swivel bearing of the starboard-side extension 311 and, on each side of this swivel bearing, into a bushing (not depicted) mounted in the through-bore arranged at the first end of each link rod 318*a*, 318*b* of the starboard-side link rods pair.

The link rods 319*a*, 319*b* of the port-side pair sandwich the port-side transverse fixing lug 317, and the link rods 318*a*, 318*b* of the starboard-side pair sandwich the starboard-side transverse fixing lug 316.

The link rods 319*a*, 319*b* of the port-side pair and the port-side transverse fixing lug 317 are articulated to one another by a connection of the clevis block type using a second pivot pin 326*b* pushed into the swivel bearing of the port-side transverse fixing lug 317 and, on each side of the swivel bearing, into a bushing (not depicted) mounted in the through-bore arranged at the second end of each link rod 319*a*, 319*b* of the port-side link rods pair.

The link rods 318*a*, 318*b* of the starboard-side pair and the starboard-side transverse fixing lug 316 are articulated to one another by a connection of the clevis block type using a third pivot pin 326*a* pushed into the swivel bearing of the starboard-side transverse fixing lug 316 and, on each side of the swivel bearing, into a bushing (not depicted) mounted in the through-bore arranged at the second end of each link rod 318*a*, 318*b* of the starboard-side link rods pair.

The link rods are thus all oriented each from the bottom up.

With the assembly of an engine mounting pylon and of an engine, in accordance with the invention, loads in X and Z are reacted by the central articulation system 312, and loads Y are reacted by the lateral articulation systems 318 and 319.

By comparison with the assembly of an engine mounting pylon with an engine, according to the prior art, and for an engine of the same size, measurements have made it possible to establish that the maximum distance between the lower spar of the engine mounting pylon and the engine can be reduced by half with the assembly of an engine mounting pylon with an engine in accordance with the invention. Thus, by virtue of the invention, the engine is situated closer to the wing.

As a preference, and as illustrated in the figures, the beam 321 is perforated and maintains material only along the load-transfer pathway of its projecting parts. In the example illustrated in the figures, for the ease of movement of the technicians who have to fix the front engine mount 363 to the engine mounting pylon, the length of the two, port and starboard, lateral panels, which are the same length, is less than that of the upper and lower spars. The length of the lower spar is less than that of the upper spar so as to allow the front engine mount 363 to be fixed to the engine leaving space in which to manipulate the tools for this purpose.

In a second embodiment, and unlike in the first embodiment, the body of the front engine mount 363 does not consist of a one-piece body but is made up of two port-side/starboard-side assemblies which are symmetrical with one another about the vertical median plane V when the front engine mount 363 is fixed to the engine mounting pylon and articulated to the engine. The engine is made up in a similar way to that described above, particularly as regards the set of front fittings 350.

The port-side assembly comprises:

a port-side elongate half-beam 321*a*, fitted into the front and to the port side of the primary structure 304, and fixed thereto. The port-side half-beam 321*a* extends from front to rear along an axis parallel to the longitudinal axis X. The port-side half-beam 321*a* comprises a planar front face 329 situated at its front end, a rear face situated at its rear end and by means of which the half-beam 321*a* is at least partially inserted into the primary structure 304. The front face 329 is situated in a plane perpendicular to the longitudinal axis X. The port-side half-beam 321*a* comprises an upper face, a lower face, a port-side lateral face and a starboard-side lateral face. The upper face, the lower face and the starboard-side lateral face are planar. The port-side half-beam 321*a* comprises, on each of these lower, upper and port-side faces, a flange for fixing the port-side half-beam 321*a* to the inside of the primary structure 304. Fixing is carried out by bolting or welding or any other known means;

a planar fixing lug 312*a*, referred to as the port-side half-beam 321*a* fixing lug, fixed to the front face 329 of the port-side half-beam 321*a* and extending towards the front of the front face 329 of the port-side half-beam 321*a* and parallel to the vertical median plane V, as an extension of the starboard-side face of the port-side half-beam 321*a*. Said fixing lug 312*a* is pierced with a through-bore the axis of which bore is parallel to the axis 320*x* oriented transversely to the vertical median plane V. The through-bore of the port-side half-beam 321*a* fixing lug 312*a* is fitted with a swivel bearing; and, a port-side projecting planar extension, referred to as port-side extension 307, and a pair of straight link rods 319*a*, 319*b*, referred to as the port-side link rods pair, which pair is articulated to the port-side extension 307. The link rods 319*a*, 319*b* of the port-side pair sandwich the port-side extension 307. The port-side extension 307 extends the front face 329 of the port-side half-beam 321*a* to the port side, beyond the plane along which the port-side lateral panel 304*c* extends. The port-side planar extension and the link rods 319*a*, 319*b* of the port-side pair which is articulated to said extension together form the port-side lateral articulation system 319.

The starboard-side assembly comprises:

a starboard-side elongate half-beam 321*b*, fitted into the front and to the starboard side of the primary structure 304, and fixed thereto. The starboard-side half-beam 321*b* extends from front to rear along an axis parallel to the longitudinal axis X. The starboard-side half-beam 321*b* comprises a planar front face 329 situated at its front end, a rear face situated at its rear end and by means of which the half-beam is at least partially inserted into the primary structure 304. The front face 329 is situated in a plane perpendicular to the longitudinal axis X. The starboard-side half-beam 321*b* comprises an upper face, a lower face, a port-side lateral face and a starboard-side lateral face. The upper face, the lower face and the port-side lateral face are planar. The starboard-side half-beam 321*b* comprises, on each of these lower, upper and starboard-side faces, a flange for fixing the starboard-side half-beam 321*b* to the inside of the primary structure 304. Fixing is carried out by bolting or welding or any other known means;

a planar fixing lug 312*b*, referred to as the starboard-side half-beam 321*b* fixing lug, fixed to the front face 329 of the starboard-side half-beam 321*b* and extending towards the front of the front face 329 of the starboard-side half-beam 321*b* and parallel to the vertical median plane V, as an extension of the port-side face of the starboard-side half-beam 321*b*. Said fixing lug 312*b* is pierced with a through-bore the axis of which bore is parallel to an axis 320*x* oriented transversely to the vertical median plane V. The through-bore of the starboard-side half-beam 321*b* fixing lug 312*b* is fitted with a swivel bearing; and, a starboard-side projecting planar extension, referred to as starboard-side extension 311, and a pair of straight link rods 318*a*, 318*b*, referred to as the starboard-side link rods pair, which pair is articulated to the starboard-side extension 311. The link rods 318*a*, 318*b* of the starboard-side pair sandwich the starboard-side extension 311. The starboard-side extension 311 extends the front face 329 of the starboard-side half-beam 321*b* to the starboard side, beyond the plane along which the starboard-side lateral panel 304*d* extends. The starboard-side planar extension and the link rods 318*a*, 318*b* of the starboard-side pair which is articulated to said extension together form the starboard-side lateral articulation system 318.

The half-beams 321*a* and 321*b* are in contact with one another, with the starboard-side face of the port-side half-beam 321*a* in contact with the port-side face of the starboard-side half-beam 321*b*. The two front faces of the half-beams 321*a* and 321*b* are coplanar and form the front face 329 of the body. The fixing lug of the starboard-side half-beam 321*b* is in contact with the fixing lug of the port-side half-beam 321*a* and the two fixing lugs of the half-beams 321*a* and 321*b* together form the central articulation system of the front engine mount 363.

The fixing lugs of the port-side half-beam 321*a* and starboard-side half-beam 321*b* are received between two branches of the clevis block which branches are separated from one another by the longitudinal axis V. The fixing lugs of the port-side half-beam 321*a* and starboard-side half-beam 321*b* are articulated to the clevis block 313 by means of a pivot pin 320 oriented transversely to the vertical median plane V. Said pivot pin 320 is pushed into the swivel bearing of each of the fixing lugs of the port-side half-beam 321*a* and starboard-side half-beam 321*b* and, similarly, on each side of this swivel bearing, into the bushings mounted in the through-bores of the branches of the clevis block.

Each of the port-side extension 307 and starboard-side extension 311 is pierced with a through-bore. Each of said bores has a respective bore axis 324*g*, 326*g*, 324*d*, 326*d* oriented parallel to the vertical median plane V, parallel to the longitudinal axis X. A port-side through-bore on the port-side extension 307 follows the bore axis 324*g* and a starboard-side through-bore on the starboard-side extension 311 follows the bore axis 324*d*. The two, port-side and starboard-side, through-bores are symmetrical with one another about the median plane V and each of the bores is fitted with a swivel bearing.

The link rods 319*a*, 319*b* of the port-side link rods pair and the link rods 318*a*, 318*b* of the starboard-side link rods pair are identical. Each link rod has two ends, and a through-bore pierced at each of the ends of the link rod.

Each link rod 319*a*, 319*b* of the port-side link rods pair is mounted articulated at its first end to the port-side extension 307 by means of a pivot pin 324*b* extending parallel to the longitudinal axis X.

The link rods 319*a*, 319*b* of the port-side pair and the port-side extension 307 are articulated to one another by a connection of the clevis block type using a pivot pin 324*b* pushed into the swivel bearing of the port-side extension 307 and, on each side of this swivel bearing, into a bushing (not depicted) mounted in the through-bore arranged at the first end of each link rod 319*a*, 319*b* of the port-side link rods pair.

Each link rod 318*a*, 318*b* of the starboard-side link rods pair is mounted articulated at its first end to the starboard-side extension 311 by means of a pivot pin 324*a* extending parallel to the longitudinal axis X.

The link rods 318*a*, 318*b* of the starboard-side pair and the starboard-side extension 311 are articulated to one another by a connection of the clevis block type using a pivot pin 324*a* pushed into the swivel bearing of the starboard-side extension 311 and, on each side of this swivel bearing, into a bushing (not depicted) mounted in the through-bore arranged at the first end of each link rod 318*a*, 318*b* of the starboard-side link rods pair.

Preferably, the pins of one of the pairs of link rods from between the pairs are mounted as a tight fit in the associated bores. What that means to say is that either the pins 324*a* and 326*a* and the link rods 318*a*, 318*b* of the associated starboard pair provide the primary load-transfer pathway, or the port-side pins 324*b* and 326*b* and the associated link rods 319*a*, 319*b* of the port-side pair provide the primary load-transfer pathway.

According to this embodiment, the pins of the other pair are mounted with radial clearance in the associated bores which is to say that the pins of the other pair provide the secondary load-transfer pathway, the one that comes into action only in the event of complete or partial breakage occurring on the primary load-transfer pathway.

The articulation of the port-side lateral articulation system 319 or, respectively, starboard-side lateral articulation system 318 to the engine is identical to that described earlier on in connection with the first embodiment.

The invention has been described for instances in which the clevis block 313 comprises two pairs of branches, with one pair of branches on each side of the clevis block. Without departing from the scope of the present invention, the clevis block could comprise just two branches, distributed one on each side of the vertical median plane V. In all cases, the central articulation system is arranged on the front face 329 and inserted between two branches that are separated from one another by the median vertical plane V and the branches of the clevis block 313 all have a through-bore. The axes of said bores are aligned and the bores passing through the branches are substantially identical, with different radial clearances. Each of the through-bores of the branches is fitted with a bushing intended to receive the pivot pin that articulates the central articulation system and the clevis block.

The invention claimed is:

1. An assembly comprising:

an engine mounting pylon; and, an aircraft engine, the aircraft engine extending along a longitudinal axis, wherein the engine mounting pylon comprises a primary structure comprising a box structure extending from a front to a rear along the longitudinal axis, the box structure separated into a port part and a starboard part by a longitudinal median vertical plane passing through the longitudinal axis, the primary structure further comprising an upper spar, a lower spar, a port-side lateral panel, and a starboard-side lateral panel, respectively forming an upper face, a lower face, a port lateral face, and a starboard lateral face of the box structure, wherein the assembly further comprises, at the rear of the box structure, a rear engine mount fixed to the engine and to the lower spar and, at the front of the box structure, a front engine mount fixed to the engine mounting pylon and to a set of fittings secured to the engine, wherein the set of fittings comprises a clevis block with branches distributed one on each side of the median vertical plane and extending parallel to the median vertical plane, and a first transverse fixing lug comprising a port-side lug on a port side of the vertical median plane and a second transverse fixing lug further comprising a starboard-side lug on a starboard side of the vertical median plane, the first transverse fixing lug and the second transverse fixing lug distributed symmetrically one on each side of the vertical median plane, wherein the front engine mount comprises an elongate body extending from a front to a rear along the longitudinal axis, partially fitted into the primary structure and extending forward, the elongated body being articulated, at a front end of the elongate body, to the clevis block with a first pivot pin extending transversely to the vertical median plane and in a space contained between a plane along which the upper spar extends and a plane along which the lower spar extends, and the elongate body being articulated, on each side of the vertical median plane, to the port-side lug and to the starboard-side lug, with, respectively, a second pivot pin and third pivot pin parallel to the longitudinal axis, wherein the elongate body comprises a front face that is planar at a front end, said front face extending along a plane transverse to the vertical median plane, the elongate body comprising a central articulation system arranged on the front face of the elongate body and inserted between two branches of the clevis block that are separated from one another by the median vertical plane, and articulated to the clevis block with the first pivot pin passing through the clevis block and the central articulation system, and two lateral articulation systems, a first lateral articulation system on the port side and a second lateral articulation system on the starboard side respectively arranged one to the port side and one to the starboard side of the front face and being symmetrical with one another about the vertical median plane, wherein the first lateral articulation system is articulated to the port-side lug with the second pivot pin, and wherein the second lateral articulation system is articulated to the starboard-side lug with the third pivot pin.

2. The assembly according to claim 1, wherein the elongate body is of one piece and comprises a beam having a planar front face forming the front face of the elongate body and a rear face forming a rear face of the elongate body, the beam comprising an upper face, a lower face, a port-side lateral face and a starboard-side lateral face, the upper face of the beam being fixed to the upper spar, the lower face of the beam being fixed to the lower spar, the port-side lateral face of the beam being fixed to the port-side lateral panel and the starboard-side lateral face of the beam being fixed to the starboard-side lateral panel.

3. The assembly according to claim 2, wherein the elongate body comprises a planar fixing lug, comprising a central fixing lug, fixed to the front face of the beam and extending forward and parallel to the vertical median plane, said central fixing lug being pierced with a through-bore, an axis of the through-bore parallel to an axis oriented transversely to the vertical median plane, the through-bore being fitted with a swivel bearing and accepting the first pivot pin.

4. The assembly according to claim 1, wherein the elongate body comprises two assemblies that are symmetrical with one another about the vertical median plane, a first assembly being a port-side assembly and a second assembly being a starboard-side assembly, wherein the port-side assembly comprises a port-side elongate half-beam fixed at a front and to the port side of the primary structure, and wherein the starboard-side assembly comprises a starboard-side elongate half-beam fixed at a front to the starboard side of the primary structure, each of the half-beams comprising a planar front face extending along a plane transverse to the vertical median plane, a rear face via which the half-beam is at least partially inserted into the primary structure, an upper face, a lower face, a port-side lateral face and a starboard-side lateral face, the port-side half-beam having a planar starboard-side face and the starboard-side half-beam having a planar port-side face, the starboard-side face of the port-side half-beam and the port-side face of the starboard-side half-beam being in contact with one another, the front faces of the two half-beams being coplanar and forming the front face of the body.

5. The assembly according to claim 4, wherein each half-beam comprises a planar fixing lug fixed to the front face of said half-beam and extending forward and parallel to the vertical median plane, the planar fixing lug of the starboard-side half-beam extending the port-side face of said starboard-side half-beam, the planar fixing lug of the port-side half-beam extending the starboard-side face of said port-side half-beam, each fixing lug of a half-beam being pierced with a through-bore having an axis which is parallel to an axis oriented transversely to the vertical median plane, the through-bores passing through the fixing lugs of the half-beams having their axes aligned, each of said through-bores being fitted with a swivel bearing and accepting the first pivot pin.

6. The assembly according to claim 1, wherein each of the branches of the clevis block comprises a through-bore having an axis which is parallel to an axis oriented transversely to the vertical median plane, the through-bores of the branches having their axes aligned, each of said through-bores being fitted with a bushing and accepting the first pivot pin.

7. The assembly according to claim 2, wherein the first lateral articulation system comprises a port-side projecting planar extension, comprising a port-side extension, and a pair of straight link rods, comprising a port-side link rods pair, which is articulated to the port-side extension and sandwiches the port-side extension, the port-side extension extending in a plane having the front face of the elongate body and extending said front face to the port side, beyond the plane along which the port-side lateral panel extends, the port-side extension having an extension through-bore with an axis which is oriented parallel to the vertical median plane and is fitted with a swivel bearing, each link rod of the port-side link rods pair having two ends, each end with a link rod through-bore fitted with a bushing, each of said link rods being articulated at a first end to the port-side extension with a fourth pivot pin inserted into the swivel bearing of the port-side extension and, on each side of said swivel bearing, into the bushing of the link rod through-bore at the first end of said link rod.

8. The assembly according to claim 7, wherein the port-side transverse fixing lug has a lug through-bore with an axis which is parallel to the longitudinal axis, each link rod of the port-side link rods pair mounted articulated to the port-side transverse fixing lug with the second pivot pin, said second pivot pin being inserted into a swivel bearing of the port-side transverse fixing lug and, on each side of said swivel bearing, into one of the bushings of one of the lug through-bores.

9. The assembly according to claim 2, wherein the second lateral articulation system comprises a starboard-side projecting planar extension, comprising a starboard-side extension, and a pair of straight link rods, comprising a starboard-side link rods pair, which is articulated to the starboard-side extension and sandwiches the starboard-side extension, the starboard-side extension extending in a plane having the front face of the elongate body and extending said front face to the starboard side, beyond the plane along which the starboard-side lateral panel extends, the starboard-side extension having an extension through-bore with axis oriented parallel to the vertical median plane and is fitted with a swivel bearing, each link rod of the starboard-side link rods pair having two ends, each end with a link rod through-bore fitted with a bushing, each of said link rods being articulated at a first end to the starboard-side extension with a fifth pivot pin inserted into the swivel bearing of the starboard-side extension and, on each side of said swivel bearing, into the bushing of the link rod through-bore at the first end of said link rod.

10. The assembly according to claim 9, wherein the starboard-side transverse fixing lug has a lug through-bore with an axis which is parallel to the longitudinal axis, each link rod of the starboard-side link rods pair mounted articulated to the starboard-side transverse fixing lug with the third pivot pin, said third pivot pin being inserted into a swivel bearing of the starboard-side transverse fixing lug and, on each side of said swivel bearing, into one of the bushings of one of the lug through-bores.

11. An aircraft comprising:

the assembly according to claim 1.

* * * * *